210-605 S?
6/2/87 OR RE 32,429

United States Patent [19] [11] E Patent Number: Re. 32,429
Spector [45] Reissued Date of Patent: Jun. 2, 1987

[54] PRODUCTION OF NON-BULKING ACTIVATED SLUDGE

[75] Inventor: Marshall L. Spector, Allentown, Pa.

[73] Assignee: Air Products and Chemicals, Inc., Allentown, Pa.

[21] Appl. No.: 593,531

[22] Filed: Mar. 26, 1984

Related U.S. Patent Documents

Reissue of:
[64] Patent No.: 4,056,465
Issued: Nov. 1, 1977
Appl. No.: 676,266
Filed: Apr. 12, 1976

[51] Int. Cl.[4] ..... C02F 3/30
[52] U.S. Cl. ..... 210/605; 210/623; 210/629; 210/630; 210/903; 210/906
[58] Field of Search ..... 210/605, 621-626, 210/627, 628, 629, 630, 903, 906

[56] References Cited

U.S. PATENT DOCUMENTS

| | | | |
|---|---|---|---|
| 3,764,523 | 10/1973 | Stankewich | 210/903 X |
| 3,939,068 | 2/1976 | Wendt et al. | 210/903 X |
| 3,953,327 | 4/1976 | Parker | 210/903 X |
| 3,964,998 | 6/1976 | Barnard | 210/903 X |
| 3,994,802 | 11/1976 | Casey et al. | 210/903 X |

OTHER PUBLICATIONS

Levin et al, "Metabolic Uptake of Phosphorus by Wastewater Organisms," *J.W.P.C.F.*, vol. 37, No. 6, Jun. 1965, pp. 800-821.
Barnard, "A Review of Biological Phosphorus Removal in the Activated Sludge Process," Water SA, vol. 2, No. 3, Jul. 1976.
Barnard, "Biological Phosphorus Removal in the Activated Sludge Process-Review and Proposals," Monthly Meeting of Institute of Water Pollution Control (SA Branch), Johannesburg, South Africa, Jul. 1975.
Nicholls, "Full Scale Experimentation on the New Johannesburg Extended Aeration Plants," Water SA, vol. 1, No. 3, Oct. 1975.
McLaren et al., "Effective Phosphorus Removal from Sewage by Biological Means," Water SA, vol. 2, No. 1, Jan. 1976.
Martin et al., "Kinetics of Enhanced Phosphorus Removal in the Activated Sludge Process," University of Cape Town, Sep. 1975.
Eckenfelder et al, "Progress in Water Technology, vol. I-Applications of New Concepts of Physical-Chemical Wastewater Treatment," Vanderbilt University, Nashville, Tenn., Sep. 18-22, 1972.
Milbury et al, "Effect of Dissolved Oxygen on Phosphorus Removal in Municipal Activated Sludge Treatment," Chem. Eng. Prog. Symposium Series, Water-1970, vol. 67, No. 107.
Nicholls, "Workshop on New Aspects of Biological Treatment," Presented by Abwassertechnische Vereinigung, etc., Pretoria, South Africa, Feb. 24-26, 1975.

*Primary Examiner*—Tom Wyse
*Attorney, Agent, or Firm*—Davis, Hoxie, Faithfull & Hapgood

[57] ABSTRACT

A modified activated sludge system is provided wherein BOD-containing wastewater and recycled sludge are initially admixed under anaerobic conditions in the substantial absence of oxygen or oxidizing agents and subsequently subjected to aeration and clarification. By the disclosed operation the selective production of non-bulking biomass is favored while effective removal of phosphates is obtained. By a further alternative modification, nitrates and nitrites are also removed by interposing an anoxic treating zone between the anaerobic zone and the aerating zone.

19 Claims, 2 Drawing Figures

PRODUCTION OF NON-BULKING ACTIVATED SLUDGE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to improvements in the treatment of municipal sewage and/or industrial wastewater by the activated sludge process. It is particularly concerned with the control of operating conditions to enhance selective production and maintenance in the system of a highly active biomass essentially free from filamentous growth, where the attained sludge has favorable settling characteristics and is capable of substantial removal of phosphate values from the incoming wastewater.

2. Prior Art

The activated sludge process has been used for many years for the removal of biological oxygen demand (BOD) from wastewater. This process consists of maintaining an aeration basin in which wastewater is fed to a suspension of microorganisms to form a mixed liquor. The mixed liquor is aerated to furnish oxygen for the respiration of biomass which sorbs, assimilates and metabolizes the biological oxygen demand of the wastewater.

After a suitable period of aeration, the mixed liquor is introduced to a clarifier in which the biomass settles and the treated wastewater overflows into the receiving stream. A major portion of the settled biomass, which is concentrated at the bottom of the clarifier, is recycled to the aeration basin, and a minor portion purged in order to maintain the constant biosolids inventory within the system. This process has been extensively described in the literature and several of its modifications summarized in a special report on "Wastewater Treatment" by R. H. Marks contained in the June 1967 issue of POWER.

Despite the versatility and effectiveness of this process and its many modifications, there remains a major problem. It is the proliferation at times of high surface area and/or filamentous species, such as sphaerotilus, which do not settle adequately in the clarifier. Thus, one consequence of filamentous biomass is the inability to disengage the biomass from the treated wastewater.

Another problem is effectiveness of removal of phosphate values from the wastewater. There have been isolated instances recorded at various cities within the United States, i.e. Los Angeles, Calif.; [Tucson, Ariz.;] San Antonio, Tex.; and Baltimore, Md., wherein phosphate removal has been observed. The reasons for such removal are obscure and the process has been unable to be extrapolated to biological wastewater treatment plants in general. Thus, to date, there are no reliable or satisfactory methods in which the control of phosphate removal by biological action alone has been generally established.

There have been several modifications of the basic activated sludge process aimed at avoiding filamentous and/or high surface area species which result in a phenomenon known as "bulking". One method is to distribute the influent wastewater to different sections of the aeration basin order to spread out the oxygen demand.

Another is to decrease the loading of BOD to the aeration basin. A third is to add poisons to the system in order to selectively kill off the high surface area filaments. Another is to temporarily make the system totally anaerobic and thus kill off the filamentous biomass which is composed largely of obligate aerobes. Another, reported in U.S. Pat. No. 3,864,246, is to maintain a high dissolved oxygen and high steady state BOD level in an initial liquid stage or its hydraulic equivalent in order to promote the selective growth of an active, nonfilamentous biomass which outgrows or precludes the development of filamentous species of higher surface area.

A number of techniques have been proposed in recent years aimed at modification of the conventional activated sludge process to effect or improve removal of nitrogen and/or phosphorous values. Among the various methods disclosed are those including nitrification-denitrification systems, one form of which is that described by Barnard, J. L., Water and Waste Engineering (1974) 33, and subject of South African Pat. No. 7205371. In this process, designated "Bardenpho", four completely mixed activated sludge basins are operated in series followed by a clarifier from which sludge is returned to the first basin. The first and third basins are operated under anoxic conditions, and receive mixed liquor containing nitrates and nitrites ($NO_x^-$) from the second and fourth basins in the series which are aerated. While periodic good removal of phosphorus and nitrogen in pilot plant operation is reported, when operating at fairly high influent retention time, the production of a dense, easily filterable sludge is not achieved.

None of the methods heretofore proposed are capable of both avoiding bulking biomass and effecting phosphate removal. It is, therefore, among the objectives of the present invention to provide a process which avoids proliferation of filamentous biomass by promoting the growth of a more desirable species which also is capable of removing phosphate values from influent wastewater. In addition, the process of the invention produces an active, dense biomass which concentrates readily in secondary clarification.

SUMMARY OF THE INVENTION

It has now been found that the desired selective production of species which are capable of removing phosphate values and producing a non-bulking biomass population of highly active, dense and rapidly settling microorganisms can be promoted and sustained by strictly maintaining anaerobic conditions during an initial stage where incoming wastewater and recycle sludge from secondary clarification are mixed. The result is that: (1) proliferation of undesired high surface area microorganisms, such as sphaerotilus, is avoided; and (2) substantial quantities of incoming BOD are sorbed from the incoming wastewater by microorganisms which have the capability of doing so under anaerobic conditions. It is hypothesized without being bound thereby, that the energy for active transport of BOD values to within cell walls is derived from hydrolysis of polyphosphates, and that those species most capable of storing polyphosphates will proliferate under these conditions.

The initial anaerobic zone, in accordance with one embodiment, is followed by an oxygenated aerobic zone, where the food sorbed in the anaerobic zone is oxidized, and where any remaining BOD is sorbed and oxidized. During this aerobic stage, the energy lost by hydrolysis of polyphosphates is recouped, and polyphosphate is reformed and stored within the aerated biomass, and phosphate values are thus removed from the mixed liquor.

In accordance with another embodiment, as will hereinafter appear, an anoxic zone for effecting denitrification, is interposed between the anaerobic and the oxygenated aerobic zone.

The nature of storage of phosphorus values within the biomass is such that only minor bleed back of phosphate occurs, thus permitting phosphorus values to be discarded from the system with waste activated sludge.

DESCRIPTION OF THE PREFERRED EMBODIMENTS

Figure 1:
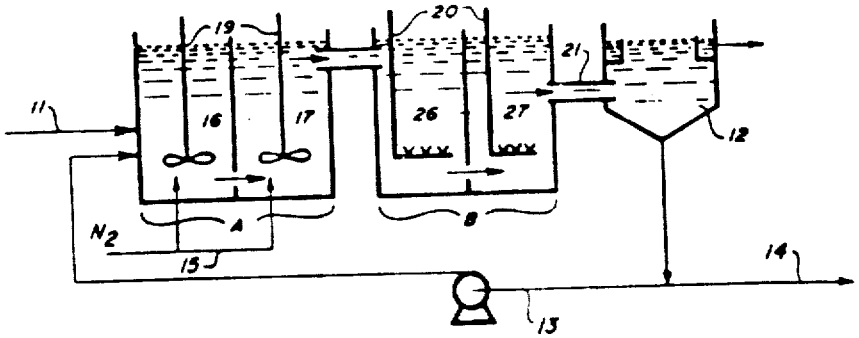
FIG. 1 of the accompanying drawings is a schematic and diagrammatic side view of a simplified system for practice of the invention.

Referring to FIG. 1 of the drawings, a modified activated sludge treating facility is represented, provided with the usual inlet 11 for the wastewater to be treated. Typically, this wastewater is settled sewage from a primary sedimentation tank or clarifier (not shown) but primary sedimentation is not a necessary condition. The influent wastewater initially enters an anaerobic mixing zone A wherein it is stirred and admixed with recycled sludge settled in the sedimentation tank or clarifier 12 and recycled to zone A by line 13. A portion of the settled sludge from clarifier 12 is removed by line 14, while the purified supernatant liquid is sent to receiving streams or reservoirs with or without further treatment as need be.

As indicated, zone A is maintained under strictly anaerobic conditions. The terms "anaerobic" and "anoxic" are not clearly or consistently defined in the literature wherein these terms are used. For the purpose of the present patent application, the term "anaerobic" is defind as the state existing within a sewage treating zone which is substantially free of $NO_x^-$(i.e. less than 0.3 ppm and preferably less than 0.2 ppm expressed as elemental nitrogen) wherein conditions are maintained such that the dissolved oxygen concentration (DO) is less than 0.7 ppm and preferably less than 0.4 ppm. The term "anoxic," as employed in the present application, is defined as the condition existing within a sewage treating zone wherein BOD is metabolized by nitrates and/or nitrites in initial total concentrations higher than about 0.5 ppm expressed as nitrogen, and dissolved oxygen is at less than 0.7 ppm, preferably at less than 0.4 ppm.

To assure that zone A is maintained under anaerobic conditions, any one or more of the following steps may be followed. The vessel constituting zone A may be provided with a blanket of nitrogen, carbon dioxide or other inert gas at the liquid surface to avoid access thereto of atmospheric air; or a loose-fitting cover may be provided at or above the liquid surface, or a rigid cover may be provided above the liquid surface. Instead, or in addition thereto, nitrogen purge gas may be admitted into and bubbled up through the mixed liquor in zone A to strip any oxygen present. The latter option is illustrated in FIG. 1 by the line 15 introducing nitrogen into the bottom of zone A.

Wastewater normally contains little or no $NO_x^-$ due to the reducing power of BOD in the presence of microorganisms in the influent. A potential source of $NO_x^-$ is from recycle sludge from the secondary clarifier and recycle mixed liquor from the aerobic treatment zone from nitrifying biological systems, i.e. those which effect oxidation of ammoniacal BOD to $NO_x^-$.

The concentration of $NO_x^-$ in the initial section of the anaerobic zone where the recycle sludge is mixed with incoming wastewater is maintained at less than 0.3 and preferably less than 0.2 ppm of $NO_x^-$, expressed as elemental nitrogen, by avoiding introduction of mixed liquor from the aerobic zone of the nitrifying system and controlling the $NO_x^-$ content in the recycle sludge from the clarifier underflow. The $NO_x^-$ concentration in the sludge recycle may be controlled by providing sufficient residence time in the clarifier and the sludge recycle system to permit adequate reduction of $NO_x^-$ to elemental nitrogen by the oxygen demand of the biomass in the sludge recycle liquor.

While not necessarily limited thereto, zone A is preferably partitioned into two or more liquid treating sections to afford plug flow of the liquid through the anaerobic zone. It has been found that by the provision of physically partitioned sections or their hydraulic equivalent, there is better assurance of achieving the desired freedom from filamentous growth and thereby attaining development of dense sludge characteristics under even adverse conditions. Such adverse conditions, for example, include operating with low concentrations of BOD wherein high surface area biomass would have an advantage in competing for sorption of a sparse food supply. By liquid staging, bypassing of untreated BOD from the anaerobic zone is precluded.

In the embodiment illustrated in FIG. 1, zone A is shown as partitioned into two sections or chambers 16 and 17, each equipped with stirring means 19. The liquid passes in approximate plug flow through the several sections of zone A and is discharged into an oxygenation zone designated B. While zone A is shown as having two partitioned sections 16 and 17, it will be understood that three or more such sections may be employed.

Zones A and B may be separate interconnected vessels, or a single basin of any desired construction may be utilized, provided with suitable means for partitioning zone A from zone B while permitting unidirectional flow of liquid from zone A to zone B without backmixing. Aeration of the liquid is effected in oxygenated zone B in known manner. Thus, as shown, compressed air may be admitted into the bottom of the oxygenated zone by spargers 20. If desired, instead of, or in addition to spargers, the oxygenated zone may be provided with mechanical aerators. Instead of air, oxygen of any desired purity may be admitted to zone B, in which event suitable means for covering all or part of the zone may be considered.

In practice, the dissolved oxygen content of zone B should be maintained above about 1 ppm and preferably about 2 ppm, to assure adequate oxygen presence for metabolism of BOD and for phosphate uptake.

As illustrated in FIG. 1, zone B is partitioned into two liquid treating sections 26 and 27, although it will be understood that a larger number of such sections may be employed, if desired. One reason for staging is that phosphate uptake is observed to be first order with respect to soluble phosphate concentration; thus low values of phosphate in the effluent are best obtained with a plug flow configuration.

In operating the system illustrated in FIG. 1, it is emphasized that the initial zone of contact and admixture of incoming wastewater with recycled sludge must be maintained under anaerobic conditions. It was unexpectedly found that under such conditions there is selective production of species of microorganisms which not only are capable of removing phosphate values, but that the obtained biomass is made of essentially nonfilamentous organisms producing a highly active, dense and rapidly settling sludge.

Production of filamentous microorganisms which are obligate aerobes is avoided since there proliferation is favored only under aerobic conditions. Under the anaerobic conditions maintained there is promoted the selective production and proliferation of a species of microorganisms capable of storing unusually high amounts of polyphosphate within their cell walls. This is done by permitting those species which are capable of hydrolyzing polyphosphate to provide energy for active transport to do so and, thus, have preferred access to influent BOD. Conversely, those species which would normally sorb food by active transport in which energy is derived from aerobic oxidation of BOD, are rendered relatively noncompetitive. The net effect is to promote proliferation of those species which can store polyphosphate during oxidation and hydrolyze polyphosphate during anaerobic feeding. Conditions which favor such microorganisms also promote relatively low sludge volume indices (Mohlmann), and relatively high zone settling velocities (ZSV). Species which assimilate and oxidize BOD most effectively ultimately dominate the biomass population. Thus, the method of this invention promotes the development of active, nonfilamentous, phosphorus-storing species to the competitive disadvantage of others. These species are capable of storing high amounts of phosphorus and proliferating in the system to the extent that the sludge has been observed to contain 6% phosphate values, expressed as elemental phosphorous on a dry basis. It has been discovered that a substantial portion of BOD is removed from the mixed liquor within the anaerobic stage described above, and further that polyphosphate is hydrolyzed as evidenced by release of soluble phosphate to the mixed liquor in the anaerobic zone.

After the initial anaerobic contact, the mixed liquor is subjected to aeration in zone B, to oxidize sorbed BOD and to complete removal and oxidation of any remaining BOD. During this period of aeration, the energy of oxidation is partially utilized for cell growth and partially utilized to energetically upgrade soluble phosphate values in the mixed liquor to stored polyphosphate within the cells of biomass. This phenomenon is observed in this aerated zone in that the concentration of soluble phosphate is rapidly reduced. After the aerobic stage, which results in both phosphate and BOD removal and stabilization, the mixed liquor can be discharged into the secondary clarifier, wherein the clear supernatant is discharged either to further treatment or directly to receiving waters.

Figure 2:
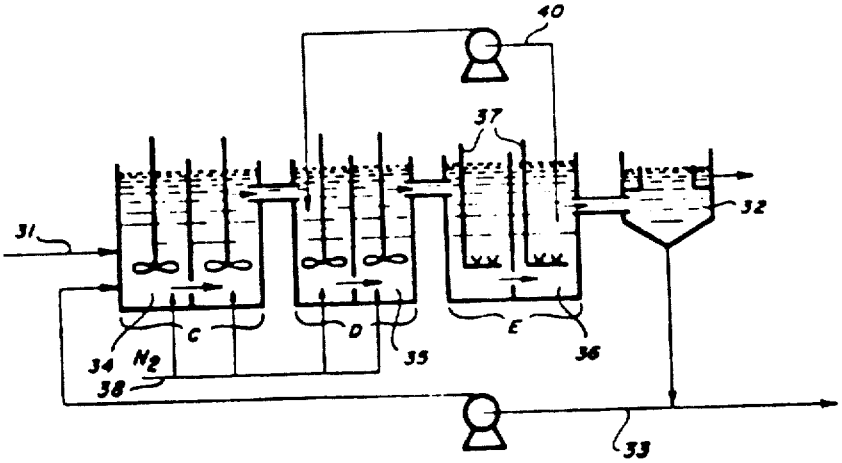
FIG. 2 is a similar view of a modified embodiment.

In the embodiment illustrated in FIG. 2, provision is made for denitrification of nitrogen values in the wastewater, while maintaining the desired production of nonfilamentous, dense sludge, with accompanying removal of phosphates, and without excessive extension of the overall treating time required. Thus, three separate treating zones are provided in the illustrated embodiment: an anaerobic zone C, followed by an anoxic zone D, and an aerobic oxygenated zone E. As in the embodiment previously described, the BOD-containing wastewater to be treated enters the modified activated sludge system of FIG. 2 by line 31, wherein it is admixed in initial treating basin or vessel 34 with recycled activated sludge returned from settler or clarifier 32. Vessel 34 is maintained under anaerobic conditions as heretofore defined; that is, precautions are observed to maintain during the initial treating stage in zone C substantially complete absence of dissolved oxygen as in the case of zone A. That is, the dissolved oxygen concentration is maintained below 0.7 ppm and preferably below 0.4 ppm.

In vessel or basin 34, the mixed liquor is stirred under strictly anaerobic conditions to permit as in the previous described embodiment incorporation of BOD values by organisms which are provided by the recycled activated sludge and thus give those species which can effect this transfer a preferential chance to obtain food and thus outgrow other species. Energy for the transfer is provided by the hydrolysis of polyphosphates contained in the biomass of the sludge recycle. In this manner, growth of species which preferentially store phosphate is encouraged. As before, substantial freedom from dissolved oxygen is assured by covering vessel 34 or otherwise preventing access thereto of atmospheric air and/or by stripping the liquor therein by bubbling nitrogen gas therethrough as indicated at 38.

As illustrated in FIG. 2, approximate plug flow is maintained in vessel 34 by partitioning that vessel for staged liquid flow through two or more physically separated or hydraulically distinct liquid stages.

From vessel or chamber 34 the mixed liquor passes into the anoxic treating zone D, represented at 35. This may be a separate vessel or may be part of a continuous treating basin suitably partitioned from the preceding zone C to permit concurrent unidirectional liquid flow without backmixing. Freedom from dissolved oxygen in zone D can be achieved as heretofore described for zone C. In FIG. 2, nitrogen gas is introduced into zone D through line 38 to strip the mixed liquor of any dissolved oxygen and prevent entry of oxygen from the atmosphere. From zone D, the mixed liquor next flows into and through the aerobic oxygenated zone E wherein it is aerated to oxidize BOD, including ammonia values and effect phosphate uptake. The oxidized mixed liquor from E flows into clarifier 32 wherein the supernatant purified liquor is separated from the settling sludge, a portion of the latter being returned in controlled amount to vessel 34 by line 33.

In anoxic zone D, nitrates and nitrites ($NO_x^-$) are admitted in concentrations higher than 2 ppm expressed as elemental nitrogen and are reduced to elemental nitrogen and discharged as such. To effect this purpose, a portion of the mixed liquor from the oxygenated zone E is returned to zone D by line 40. These nitrates and nitrites are formed in zone E by oxidation of nitrogen values (considered as ammonia) contained in the influent wastewater which entered the system by line 31. In the oxygenated zone E, the balance of the BOD is metabolized and the ammonia is oxidized to nitrites and ultimately, at least in part, to nitrates. The oxidized mixed liquor from the last stage of zone E is returned to an initial stage of Zone D, wherein the nitrate and nitrite content is brought into contact with incoming BOD. Care must be taken to avoid introduction of $NO_x^-$ into the anaerobic zone (C).

By operating in accordance with the scheme illustrated in FIG. 2, not only is the selective production of nonfilamentous biomass with desired removal of phosphate obtained as in the embodiment of FIG. 1, but also substantial removal of nitrogenous nutrients is also achieved. Moreover, the desired removal of nitrogen values is effected without substantially prolonging the overall treating time requirements.

The amount of mixed liquor recycled from the oxygenated zone E to the anoxic zone D may, in practical operation, constitute from 100 to 400% of the raw influent volumetric flow entering the system through line 31. The amount of sludge recycled by line 33, as well as in the case of line 13 (FIG. 1), may be in the order of from about 10 to 50%, preferably 20 to 30% of the raw influent.

Oxygenated zone E is operated in substantially the same manner as zone B previously described. The treated liquor is passed from the oxygenated zone (B or E) to the clarifier. To assure good removal of BOD and effective nitrification, the aeration zone should be operated throughout at a minimum D.O. level of 1 ppm and preferably greater than 2 ppm. When higher dissolved oxygen levels at the discharge end of the oxygenated zone are required, they may be imposed without adverse effect on the system.

In the practice of the invention, the mixed liquor is passed in approximate plug flow through the entire treating system constituted by zones A and B in the embodiment of FIG. 1 or zones C, D and E in the embodiment of FIG. 2. It has been observed that the rate of denitrification varies directly with $NO_x^-$ concentration when such concentration is below about 2 ppm and therefore, a plug flow configuration is preferred to attain low $NO_x^-$ values in the effluent from zone D. Moreover, in the preferred practice, each of these zones, C, D and E, is operated in liquid staged pattern, each such treating zone being physically partitioned into two or more separate treating stages or their hydraulic equivalent, as determined by residence time distribution via tracer experiments (see Levenspiel, "Chemical Reaction Engineering," John Wiley and Sons, New York, 1962, pages 242-308).

The need for inclusion in the system of an anoxic zone for nitrogen removal will depend upon the content of ammonia values in the influent wastewater and the limitations imposed upon the permissible nitrogen content of the purified water effluent discharged. As a rule, without being necessarily limited thereto, the incorporation of the intermediate anoxic zone is generally indicated whenever the influent wastewater contains in excess of about 10 parts per million of ammonia nitrogen expressed as elemental nitrogen.

EXAMPLE 1

A system operating on the principle of the embodiment of FIG. 1 was tested over a period of several months in the treatment of municipal wastewater from Allentwon, Pennsylvania. The system employed an anaerobic zone of 6 liters subdivided by partitions into five equal stages (1.2 liters each) followed by an oxygenated zone of 10 liters subdivided by partitions into five equal stages (2 liters each) into which air was sparged. Nitrogen gas was sparged through the anaerobic zone, which was fitted with a loosely-sealed rigid cover. From the last stage of aeration, the oxidized mixed liquor was passed into a clarifier, from which a portion of the settled sludge was recycled to the initial anaerobic stage, in the amount of about 20% by volume of the wastewater influent. The results reported in Table 1 below are the averages over a period of ten days operation.

It will be seen from the reported results in Table 1 that a desirable sludge volume index was maintained, indicative of a dense, easily settling sludge, while more than 90% removal of phosphate was attained. BOD removal averaged as high as 95% or more.

The sludge retention time in the clarifier and sludge recycle was about 1.7 hours, which was adequate to effect reduction of $NO_x^-$ from 11.26 ppm as estimated from the clarifier effluent, to 0.18 ppm in the sludge recycle liquor.

TABLE 1

| | | In Fresh Influent | In sludge Recycle | In Clarified Liquid |
|---|---|---|---|---|
| MLVSS mg/L | 4082 | | | |
| COD (filtered) influent, mg/L | 286 | | | |
| COD (filtered) effluent, mg/L | 48.88 | | | |
| $BOD_5$ (filtered) influent mg/L | 127.4 | | | |
| $BOD_5$ (filtered) effluent mg/L | 5.72 | | | |
| Influent detention time, hrs. | 2.86 | | | |
| Sludge recycle, % influent | 20.73 | | | |
| Nominal residence time | | | | |
| Anaerobic zone, hrs. | 0.89 | | | |
| Aeration zone, hrs. | 1.48 | | | |
| Phosphorus (as P) mg/L | | 6.1 | 3.85 | 0.44 |
| $NH_3$ (as N) mg/L | | 18.35 | 0.82 | 0.43 |
| $NO_2^-$ (as N), mg/L | | 0.08 | 0.18 | 11.26 |
| ZSV, ft/hr | 6.44 | | | |
| SVI, ml/g TSS | 69 | | | |
| D.O. in anaerobic zone, mg/L | 0.29-0.32 | | | |
| D.O. in aerobic first zone, mg/L | 6.41 | | | |
| D.O. in aerobic last zone, mg/L | 6.16 | | | |

The content of nitrates and nitrites (measured as $NO_x^-$ nitrogen) in the five sections of the anaerobic zone remained below 0.16 mg/L. The phosphate concentrations expressed as mg P/L in the ten sections were respectively: 9.35, 12.87, 13.55, 13.63, 13.07, 6.64, 3,65, 1.78, 1.05 and 0.72. These values indicate phosphate release in the first five anaerobic sections and exponential phosphate uptake in the last five aerobic sections.

EXAMPLE 2

A system operating in accordance with the flow scheme of FIG. 2 was used in the treatment of municipal wastewater from Allentown, Pennsylvania. The system comprised three separate vessels providing an anaerobic zone (I) of 7.2 liters divided by partitions into three equal chambers of 2.4 liters each; an anoxic zone (II) of 3.6 liters divided by partitions into three equal chambers of 1.2 liters each; and an oxygenated zone (III) of 12 liters divided by partitions into four chambers respectively of 1.2, 2.4, 3.6 and 4.8 liters. Nitrogen gas was admitted to each chamber of the anaerobic and anoxic zones to maintain substantial freedom from oxygen. The mixed liquor from the last chamber of the aeration vessel (III) flowed into a clarifier from which the purified supernatant liquor was withdrawn, while a portion of the settled sludge was recycled to the first chamber of the anaerobic zone, in which it was contacted and mixed with the influent wastewater. The mixer liquor thus passed successively through the system in plug flow and in staged liquid sequence in each of the zones. A portion of the mixed liquor from the last chamber of the oxygenated zone (III) was withdrawn and recycled to the first chamber of the anoxic zone (II). Oxygen was supplied to the oxygenated zone by sparging air through the mixed liquor.

The operating conditions and results are reported in Table 2 below, based on the average over a week of operation.

The sludge retention time in the clarifier and sludge recycle was about 1.4 hours, which was adequate to effect reduction of $NO_x^-$ from 4.85 ppm, as estimated from the clarifier effluent, to 0.07 ppm in the sludge recycle liquor.

TABLE 2

| | | In fresh feed | In sludge recycle | In clarified liquid | In (III-II) Internal Recycle | In flow I to II | In flow II to III |
|---|---|---|---|---|---|---|---|
| MLVSS, mg/L | 3399 | | | | | | |
| COD (unfil) influent, mg/L | 258.5 | | | | | | |
| COD (fil) influent, mg/L | 155.0 | | | | | | |
| $BOD_5$ (fil) influent, (avg.) mg/L | 42.24 | | | | | | |
| $BOD_5$ (fil) effluent (avg.) mg/L | 2.07 | | | | | | |
| Sludge recycle, % influent | 30.52 | | | | | | |
| Internal Recycle, III to II, % influent | 182.9 | | | | | | |
| Influent detention time hrs. | 2.95 | | | | | | |
| Phosphates as P, mg/L | 86.48 | 3.33 | 4.13 | 0.45 | 1.39 | 15.34 | 8.19 |
| % removed | | | | | | | |
| Ammonia Nitrogen as N, mg/L | 97.03 | 13.51 | 2.34 | 0.40 | 0.69 | 8.58 | 4.88 |
| % removed | | | | | | | |
| $NO_2^-$ Nitrogen as N, mg/L | 61.34 | 0.7 | 0.07 | 4.85 | 5.51 | 0.06 | 1.29 |
| % removed | | | | | | | |
| SVI, (avg.) mL/g TSS | 154.0 | | | | | | |
| SVI, stirred mL/g | 51.79 | | | | | | |
| Zone Settling Velocity, ft/hr | 4.40 | | | | | | |

The nitrogen and phosphorus concentrations in each of the sections of the system reported in Table 2 is given in Table 3 below, together with the DO levels.

TABLE 3

| | ZONE I | | | ZONE II | | | ZONE III | | | |
|---|---|---|---|---|---|---|---|---|---|---|
| Section | 1 | 2 | 3 | 4 | 5 | 6 | 7 | 8 | 9 | 10 |
| $NO_3^-$, mg/L | 0.05 | 0.05 | 0.06 | 2.1 | 1.69 | 1.29 | 2.23 | 3.71 | 5.21 | 5.51 |
| $NH_3$—N, mg/L | 10.43 | 10.04 | 8.58 | 5.32 | 5.05 | 4.88 | 3.92 | 2.44 | 1.16 | 0.69 |
| $PO_4^{-3}$—P, mg/L | 10.46 | 14.11 | 15.34 | 10.24 | 8.49 | 8.19 | 6.33 | 4.53 | 2.60 | 1.39 |
| DO, mg/L | 0.14 | 0.12 | 0.13 | 0.43 | 0.35 | 0.43 | 7.47 | 7.14 | 5.29 | 3.54 |

The system provides favorable economics not only resulting from the savings in the cost of chemicals otherwise required to effect desired removal of phosphates, but also from the standpoint of the high rates of wastewater throughput per unit of liquid volume capacity, with excellent removal of BOD and COD values. Thus, even in instances or vicinities in which the phosphate content of the influent wastewater does not pose a problem, the system of the invention offers important economic advantages because of the high throughput rates. Embodiments of the type illustrated in FIGS. 1 and 2 attain excellent results when operating on typical municipal wastewaters at an influent detention time in the order of about three hours at about 20° C. A somewhat higher influent detention time may be required in industrial wastewater systems wherein the soluble BOD is in excess of about 150 ppm. Existing activated sludge systems can be readily modified, at low cost, to operate in accordance with either of these embodiments.

Contributing importantly to the economic advantages of systems operating in accordance with the invention is the high density of the clarifier underflow liquid, indicative of good settling velocity and virtual absence of filamentous biomass (confirmed by microscopic examination). Thus, solids concentration in the clarifier underflow of 3.6% volatile suspended solids (VSS) was had in operations according to the invention, whereas conventional systems operate at about or below 1% VSS in the clarifier underflow. The thickened underflow and high zone settling velocities attained thus afford cost advantages even in areas where neither phosphorous removal nor nitrification is required. In addition, the systems of the invention attain reduction of phosphate (as P) in the influent wastewater to 1 ppm or less, reduction of influent BOD to less than 10 ppm, with complete removal of ammonia and reduction in total nitrogen values (as N) to less than 25% of that in the influent.

The system described in FIG. 2 may also be desirable where neither phosphate removal nor nitrification is required, because of the good sludge properties obtained. Another factor contributing to the advantages of the system is the savings in oxygen requirements where nitrification is required, since the oxygen in $NO_x^-$ effects metabolism of BOD in the anoxic zone. Further, reduction of $NO_x^-$ values in the mixed liquor entering the clarifier minimizes the release of nitrogen at that point. Thus, "floating sludge," caused by nitrogen release in the clarifier, commonly observed in nitrification effluents, is avoided.

The systems described in FIGS. 1 and 2 also have the advantage of producing a biomass that contains up to 6% or more of phosphorus by weight. Thus, a method is provided wherein a high phosphorus content can be attained. This may be advantageous for industrial use. An obvious application is enhanced fertilizer quality of waste biomass.

What is claimed is:

1. In the operation of an activated sludge system the method of inhibiting proliferation of filamentous biomass consisting essentially of:

producing a mixed liquor by mixing in an initial contact zone recycled activated sludge with BOD-containing wastewater influent;

*substantially the entirety of* said initial contact zone *and its contents* being maintained *in the absence of supplied oxygen-containing gas* under [anaerobic] conditions such as to be substantially free of $NO_x^-$ and to contain a concentration of less than 0.7 ppm dissolved oxygen; thereby effecting selective production of nonfilamentous microorganisms, capable of sorbing BOD *in the absence of supplied oxygen-containing gas under said conditions;* oxidizing BOD in the mixed liquor in a subsequent oxygenated zone to cause removal of BOD by contact with oxygen-containing gas admitted to said oxygenated zone, said oxygenated zone having maintained therein a dissolved oxygen content of at least 1 ppm;

transferring the oxidized mixed liquor from said oxygenated zone to a settling zone wherein purified supernatant liquid is separated from settled sludge;

and returning a portion of said settled sludge to said initial contact zone to provide the activated sludge admixed therein with the wastewater influent.

2. The method as defined in claim 1 wherein said initial contact zone comprises a series of at least two hydraulically distinct sections in concurrent liquid flow communication.

3. The method as defined in claim 2 wherein said distinct sections are physically separated by partitions.

4. The method as defined in claim 1 wherein said initial contact zone contains less than 0.4 ppm of dissolved oxygen.

5. The method as defined in claim 1 wherein said oxygenated zone comprises a series of at least two hydraulically distinct sections in concurrent liquid flow communication.

6. The method as defined in claim 5 wherein said distinct sections of said oxygenated zone are physically separated by partitions.

7. In the operation of an activated sludge system to effect biological removal of phosphates from influent wastewater while inhibiting proliferation of filamentous biomass, the method consisting essentially of:

producing a mixed liquor by mixing in an initial contact zone recycled activated sludge with wastewater influent containing BOD and phosphates; *substantially the entirety of* said initial contact zone *and its contents* being maintained *in the absence of supplied oxygen-containing gas* under [anaerobic] conditions such as to be substantially free of $NO_x^-$ and to contain a concentration of less than 0.7 ppm dissolved oxygen; thereby effecting selective production of nonfilamentous microorganisms, capable of sorbing BOD *in the absence of supplied oxygen-containing gas under said conditions* and capable of storing polyphosphate under oxidizing conditions;

oxidizing BOD in the mixed liquor in a subsequent oxygenated zone to cause removal of BOD by contact with oxygen-containing gas admitted to said oxygenated zone, thereby simultaneously effecting storage of phosphates within said microorganisms; said oxygenated zone having maintained therein a dissolved oxygen content of at least 1 ppm;

transferring the oxidized mixed liquor from said oxygenated zone to a settling zone wherein purified supernatant liquid is separated from settled sludge;

and returning a portion of said settled sludge to said initial contact zone to provide the activated sludge admixed therein with the wastewater influent.

8. The method as defined in claim 7 wherein said initial contact zone comprises a series of at least two hydraulically distinct sections in concurrent liquid flow communication.

9. The method as defined in claim 8 wherein said distinct sections are physically separated by partitions.

10. The method as defined in claim 7 wherein said initial contact zone contains a total of less than 0.4 ppm dissolved oxygen.

11. The method as defined in claim 7 wherein nitrogen gas is contacted with mixed liquor in said initial contact zone to maintain anaerobic conditions therein.

12. The method of claim 7 where the biological sludge produced contains phosphate values in the order of up to 6%, expressed as elemental phosphorus on a dry basis, a portion of which is recovered for industrial use.

13. The method as defined in claim 7 wherein said wastewater influent further contains ammonia values and wherein the mixed liquor formed in said initial [anaerobic] contact zone is further treated in an anoxic zone under anoxic conditions before its being sent to the oxygenated zone; said anoxic conditions including a dissolved oxygen content not in excess of 0.7 ppm and the admission to said zone of nitrates and/or nitrites; said nitrates and/or nitrites being obtained by internal transfer of mixed liquor thereto from the oxygenated zone, said mixed liquor having a concentration of nitrates and/or nitrites in excess of 2 ppm, expressed as elemental nitrogen, and said nitrates and/or nitrites being reduced in said anoxic zone to elemental nitrogen gas.

14. The method as defined in claim 13 wherein said mixed liquor transferred from said oxygenated zone to said anoxic zone constitutes 100 to 400% by volume of the fresh wastewater influent admitted to said initial contact zone.

15. The method as defined in claim 13 wherein the sludge recycled to said initial contact zone constitutes 10 to 50% by volume of the fresh wastewater influent admitted to said initial contact zone.

16. The method as defined in claim 13 wherein said anoxic zone is comprised of a series of two or more sections in liquid flow communication.

17. The method as defined in claim 13 wherein the total influent detention time in said initial [anaerobic] contact zone, said anoxic zone and said aerating zone does not substantially exceed three hours.

18. The method as defined in claim 7 wherein the sludge recycled to said initial contact zone constitutes 10 to 50% by volume of the fresh wastewater influent admitted to said initial contact zone.

19. The method as defined in claim 7 wherein the total influent detention time in said initial [anaerobic] contact zone and said aerating zone does not substantially exceed three hours.

* * * * *

UNITED STATES PATENT AND TRADEMARK OFFICE

CERTIFICATE OF CORRECTION

PATENT NO. : Re. 32,429

DATED : June 2, 1987

INVENTOR(S) : Marshall L. Spector

It is certified that error appears in the above-identified patent and that said Letters Patent is hereby corrected as shown below:

Col. 8, line 34 "$NO_2^-$" should be --$NO_x^-$--.

Col. 9, Table 2, "$NO_2^-$" should be --$NO_x^-$--.

Col. 9, Table 3, "$NO_3^-$" should be --$NO_x^-$--.

Signed and Sealed this

Eighth Day of March, 1988

*Attest:*

DONALD J. QUIGG

*Attesting Officer*

*Commissioner of Patents and Trademarks*